Patented Aug. 28, 1951

2,565,461

UNITED STATES PATENT OFFICE 2,565,461

CARBONYLATION OF AROMATIC HALIDES

Harding Bliss, Mount Carmel, Conn., and Raymond W. Southworth, Upton, N. Y.

No Drawing. Application May 28, 1949, Serial No. 96,164

7 Claims. (Cl. 260—515)

This invention relates to a process for carbonylation of aryl halides, such as monochlorobenzene, dichlorobenzenes and related compounds.

The term "carbonylation," as employed herein, means the introduction of C=O into an organic molecule.

The carbonylation of an aryl halide, e. g. dichlorobenzene, may be illustrated by any of the following equations:

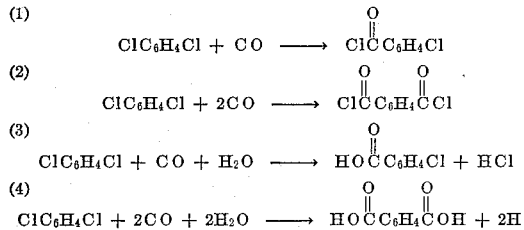

When the dichlorobenzene which is employed is para-dichlorobenzene the carbonylation product is terephthalic acid, or intermediates which, if desired, can be converted readily to terephthalic acid.

Carbonylation of organic halides in the presence of certain specific catalysts (generally of the Friedel-Crafts type) have been known heretofore (Thomas, Anyhdrous Aluminum Chloride in Organic Chemistry, Rheinhold Publishing Corp., New York, N. Y., 1941, page 767; Arch. Pharm. 265,187–95 (1927); German patent 537,610; U. S. Patents 2,003,477, 2,053,233, 2,062,-344, 2,378,048, 2,411,982; British Patents 547,101 and 581,278; copending application S. N. 14,384, filed September 1, 1948).

An object of the present invention is to provide an improved catalytic process for carbonylation of aryl halides. Other objects of the invention will appear hereinafter.

It has been discovered in accordance with this invention that nickel carbonyl, and other metal carbonyls which are very similar thereto, are effective agents in the carbonylation of aryl chlorides, bromides and iodides having at least one of the said halogens attached directly to an aromatic nucleus.

The present invention provides a novel method for carbonylation of aryl halides, by the use of nickel carbonyl, or a similar metal carbonyl, as an agent which assists or effects the carbonylation reaction. Whether the metal carbonyl is considered as acting catalytically, or as an active carbon monoxide carrier, or as a reactant, or a substance which generates a transitory active agent, is not necessarily known, and such theoretical considerations are not intended to limit the invention in any way.

Inorganic acids, such as aqueous hydrochloric acid or other aqueous mineral acids, may be present in the reaction mixture if desired, but when such acids are employed it is generally desirable to introduce a sufficiently large quantity of metal carbonyl to avoid excessive partial loss thereof by side reaction with the said acid. It is especially significant that hydrochloric acid can be tolerated in the reaction mixture, since, as illustrated in Equations 3 and 4, supra, hydrochloric acid may be produced by the carbonylation reaction. In fact, the addition of a mineral acid may in certain instances be beneficial, although it is not, in general, absolutely essential.

The metal carbonyls which may be employed in the practice of the invention are carbonyls of metals which are members of the iron sub-group, namely iron, nickel and cobalt.

It is usually desirable to employ at least about one mol of metal carbonyl per equivalent of the C-halogen group reacting. In a continuous process this can be accomplished by continuously replenishing the metal carbonyl to make up for any losses caused by reaction or by thermal decomposition; thus, if the process is operated continuously, the quantity of nickel carbonyl which is introduced or which may be generated per unit of reaction time should be preferably at least one mol per mol of C-halogen group reacting. In batchwise operation it is preferable to employ initially at least one equivalent (0.25 mol) of nickel carbonyl per equivalent of C-halogen group reacting. This, of course, is not intended to imply that an excess of the organic halide cannot be present, but rather that the number of equivalents of C-halogen group undergoing reaction may be limited by the number of available equivalents of nickel carbonyl. Reaction mixtures containing from 0.25 to 2.5 mols of nickel carbonyl per equivalent of C-halogen give the best results.

The carbonylation of aryl halides in accordance with this invention takes place relatively slowly at temperatures below about 200° C. It it therefore generally preferred to carry out the reaction at a temperature within the range of about 250° to 350° C. Best results are obtained when superatmospheric pressures are employed, preferably pressures within the range of about 200 to 1500 atmospheres.

Any convenient or suitable apparatus may be used in the carbonylation of aryl halides according to the process of this invention. In batchwise operation pressure-resistant autoclaves made of or lined with relatively inert metals, such as stainless steel, silver, copper, etc., may be employed advantageously. In continuous operation tubular reaction vessels may be employed and, if desired, the reactants may be introduced at more than one point along the tubular reaction vessel. Similarly the metal carbonyl, or a substance which produces the metal carbonyl under the reaction conditions, may be injected at one or more points along a tubular reaction vessel, if desired.

If carboxylic acids are the reaction products which it is desired to obtain in the practice of the invention, it is generally convenient to employ water or aqueous hydrochloric acid as a reaction medium. In this manner any acyl halide which may be produced transitorily is hydrolyzed under the reaction conditions and thereby converted to carboxylic acid. It is, of course, also possible to employ other diluents which may be either inert or reactive, depending upon the results desired. Such diluents include cyclohexane, alkanes, benzene, alkanoic acids, alkanoic esters, and the like.

Any suitable method may be employed for separating the carbonylation products from the reaction mixture obtained in the practice of the invention. The carboxylic acids in general can be separated from each other by reason of their differences in solubility in water; terephthalic acid, for example, is quite insoluble and therefore can generally be separated without difficulty. Other reaction products, such as acyl halides, can be separated from the reaction mixture by simple distillation. For reasons of economy, it is frequently desirable to convert all of the nickel in the reaction product to nickel carbonyl and to recover the said nickel carbonyl and recycle the same along with additional quantities of aryl chloride.

While carbon monoxide is quite invariably present in the reaction mixture, it should be understood that the introduction of carbon monoxide from an external source is not always necessary, since the carbon monoxide which is combined with the nickel carbonyl is also effective in the carbonylation reaction.

The invention is illustrated further by means of the following examples.

*Example 1.*—A mixture of para-dichlorobenzene, nickel carbonyl, 6N HCl and carbon monoxide was heated under the conditions set forth in the following table. The table also records the quantities of carbonylation products thus produced.

*Example 2.*—A mixture containing 147 grams of orthodichlorobenzene, 45 grams of nickel tetracarbonyl, and 19 grams of 6N HCl was heated under a pressure of 4150 pounds per square inch at a temperature of 310° for two hours. The total conversion to acids was only 2%, of which 86.8% was ortho-chlorobenzoic acid and 13.2% was phthalic acid.

*Example 3.*—A reaction mixture containing 112 grams of monochlorobenzene, 45 grams of nickel tetracarbonyl, 5 grams of activated nickel-aluminum alloy catalyst, and 5 grams of $NiI_2$ was heated at a pressure of 3700 pounds per square inch with carbon monoxide at a temperature of 290° for two hours. The resulting product contained no unreacted monochlorobenzene, and the quantity of benzoic acid formed from the product was 26 grams, which corresponded to a 21% yield of benzoic acid based upon the number of mols of monochlorobenzene reacting.

*Example 4.*—Into a stainless steel shaker tube was charged 26 grams p-chlorotoluene, 50 cc. benzene, 29.9 grams cobalt carbonyl, 71 cc. concentrated hydrochloric acid and 71 cc. of water. Carbon monoxide was then injected into the mixture, and the tube was heated at a pressure of 600 atmospheres and a temperature of 296° to 303° C. for one hour. The products were discharged, and the reaction vessel was washed first with benzene and then with water. Solids were removed from the reaction product by filtration. These solids were taken up in aqueous alkali and the alkaline solution was filtered to remove insoluble material. The resulting filtrate was acidified, which caused the precipitation of 4.0 grams of p-toluic acid. The benzene layer in the initial reaction product contained the unreacted p-chlorotoluene and also additional quantities of p-toluic acid.

*Example 5.*—Into a stainless steel shaker tube was charged 26 grams p-chlorotoluene, 19 grams toluene, 40 grams iron carbonyl, 71 cc. water, and 36 cc. concentrated hydrochloric acid. This mixture was heated at a temperature of 300° C. under a pressure of 600 atmospheres with carbon monoxide for about one hour. The product was worked up in the manner described in Example 4. The weight of p-toluic acid thus obtained was 9.0 grams.

It is to be understood that the foregoing examples are illustrative only and that they are not intended to limit the scope of the invention in any way. Numerous methods for modifying the illustrated procedure will be apparent to those who are skilled in the art. The halogen substituent may be bromine or iodine without changing the procedure given for the chloro com-

*Carbonylation of para-dichlorobenzene*

| Run No. | Cl-C6H4-Cl grams | Catalyst Compd. | Grams | Pressure, p. s. i. g. | Temp., °C. | Length of Run, hours | Cl-C6H4-COOH Per Cent COOH in Prod. | HOOC-C6H4-COOH Per Cent COOH in Prod. | Per Cent Conv. to Acids |
|---|---|---|---|---|---|---|---|---|---|
| 1 | 150 | NiCl₂ / NH₄OH | 33 / 52 | 3,250 | 310 | 5 | 72.7 | 27.3 | 14 |
| 2 | 150 | Ni(CO)₄ / HCl | 180 / 76 | 3,500 | 290 | 1 | 68.0 | 32.0 | 11 |
| 3 | 75 | Ni(CO)₄ / HCl | 67 / 28 | 3,600 | 290 | 1.3 | 65.7 | 34.3 | 9 |
| 4 | 75 | Ni(CO)₄ / HCl | 45 / 19 | 3,650 | 350 | 1.5 | 52.3 | 47.7 | 2 |
| 5 | 147 | Ni(CO)₄ / HCl | 45 / 19 | 4,300 | 310 | 2 | 89.5 | 10.5 | 20 | pounds. Alkaline acceptors for the hydrogen halide which may be generated when the carbonylation is carried out in an aqueous system may be introduced if desired, and in this manner the pH of the reaction mixture can be kept within desirable limits. The unreacted aryl halide may, of course, be recovered and recycled. This is true also of the intermediate reaction products, such as the monochlorobenzoic acids, which are formed when the aryl halide reactant contains more than one C-halogen linkage. It is our intention that such changes and modifications to the extent that they are within the scope of the appended claims shall be considered as part of our invention.

We claim:

1. The method for carbonylation of compounds having a halogen atom of the class consisting of chlorine bromine and iodine attached directly to an aromatic nucleus which comprises carrying out the said carbonylation reaction in the presence of a carbonyl of a metal of the iron subgroup.

2. The method for carbonylation of aryl chlorides having a chlorine atom attached to an aromatic nucleus which comprises carrying out the said carbonylation reaction in the presence of nickel carbonyl.

3. The method of claim 2, in which the said aryl chloride is para-dichlorobenzene.

4. The method of claim 2, in which the said aryl chloride is ortho-dichlorobenzene.

5. The method of claim 2, in which the said aryl chloride is monochlorobenzene.

6. In a process for carbonylation of para-dichlorobenzene the step which comprises introducing nickel tetracarbonyl, para-dichlorobenzene and carbon monoxide into a reaction vessel, heating the resulting mixture at a temperature of 250° to 350° C. under a pressure within the range of 200 to 1500 atmospheres, whereby carbonylation of the para-dichlorobenzene occurs, and thereafter separating the resulting carbonylation product from the reaction mixture.

7. In a process for carbonylation of para-dichlorobenzene the step which comprises heating nickel tetracarbonyl, para-dichlorobenzene, water, HCl and carbon monoxide at a temperature of 250° to 350° C. under a pressure within the range of 200 to 1500 atmospheres, whereby terephthalic acid is produced, and thereafter separating terephthalic acid from the resulting mixture.

HARDING BLISS.
RAYMOND W. SOUTHWORTH.

REFERENCES CITED

The following references are of record in the file of this patent:

UNITED STATES PATENTS

| Number | Name | Date |
| --- | --- | --- |
| 2,053,233 | Woodhouse | Sept. 1, 1936 |
| 2,062,344 | Wiezevich et al. | Dec. 1, 1936 |
| 2,084,284 | Scott | June 15, 1937 |
| 2,411,982 | Theobald | Dec. 3, 1946 |

FOREIGN PATENTS

| Number | Country | Date |
| --- | --- | --- |
| 308,666 | Great Britain | June 5, 1930 |
| 448,884 | Belgium | Feb. 12, 1943 |
| 581,278 | Great Britain | Oct. 7, 1946 |
| 621,520 | Great Britain | Apr. 11, 1949 |

OTHER REFERENCES

Du Pont, Chem. Abstracts, vol. 31, col. 6838 (1937).

Reppe, Fiat Final Report #273 (by Peck et al.), October 2, 1945, pp. 8-12.